(12) United States Patent
Adair et al.

(10) Patent No.: US 12,714,151 B2
(45) Date of Patent: Aug. 25, 2026

(54) AEROSOL GENERATION DEVICE WITH CAPACITIVE SENSOR AND MANUFACTURING METHOD THEREOF

(71) Applicant: JT International S.A., Geneva (CH)

(72) Inventors: Kyle Adair, Lisburn (GB); Olayiwola Olamiposi Popoola, Walton-on-Thames (GB); Peter Loveday, Epsom (GB)

(73) Assignee: JT International SA, Geneva (CH)

( * ) Notice: Subject to any disclaimer, the term of this patent is extended or adjusted under 35 U.S.C. 154(b) by 494 days.

(21) Appl. No.: 18/274,916

(22) PCT Filed: Nov. 8, 2021

(86) PCT No.: PCT/EP2021/080875
§ 371 (c)(1),
(2) Date: Jul. 28, 2023

(87) PCT Pub. No.: WO2022/171320
PCT Pub. Date: Aug. 18, 2022

(65) Prior Publication Data

US 2024/0023626 A1 Jan. 25, 2024

(30) Foreign Application Priority Data

Feb. 15, 2021 (EP) .................................... 21157091

(51) Int. Cl.

| | |
|---|---|
| ***A24F 40/51*** | (2020.01) |
| ***A24F 40/40*** | (2020.01) |
| ***A24F 40/60*** | (2020.01) |
| ***A24F 40/70*** | (2020.01) |
| ***G01D 5/241*** | (2006.01) |

(52) U.S. Cl.
CPC .............. *A24F 40/51* (2020.01); *A24F 40/40* (2020.01); *A24F 40/60* (2020.01); *A24F 40/70* (2020.01); *G01D 5/2417* (2013.01)

(58) Field of Classification Search
None
See application file for complete search history.

(56) References Cited

U.S. PATENT DOCUMENTS 5,975,288 A * 11/1999 Crowder ................ A24F 25/02 206/242
2006/0243462 A1 11/2006 Schilling et al.
(Continued)

FOREIGN PATENT DOCUMENTS

CN 103607191 A 2/2014
CN 110267143 A 9/2019
(Continued)

OTHER PUBLICATIONS

International Search Report for PCT/EP2021/080875 mailed Feb. 23, 2022. 4 pages.

*Primary Examiner* — Cynthia Szewczyk
(74) *Attorney, Agent, or Firm* — Lerner David LLP

(57) ABSTRACT

An aerosol generation device for consuming an aerosol generation substrate includes a housing and a control unit, the housing having an outer layer having an elastically deformable area, and the control unit including: a printed circuit board having a plurality of electrical transmission lines for electrically connecting components thereon, and a capacitive sensor component arranged on the printed circuit board.

19 Claims, 3 Drawing Sheets

(56) References Cited

U.S. PATENT DOCUMENTS

| | | | | |
|---|---|---|---|---|
| 2013/0247924 | A1 | 9/2013 | Scatterday et al. | |
| 2013/0284191 | A1 | 10/2013 | Scatterday et al. | |
| 2017/0188627 | A1* | 7/2017 | Sur | G08C 17/02 |
| 2019/0159519 | A1 | 5/2019 | Bowen et al. | |
| 2020/0237007 | A1 | 7/2020 | Qiu et al. | |
| 2020/0315254 | A1 | 10/2020 | Zielazek et al. | |
| 2021/0235754 | A1 | 8/2021 | Yamada et al. | |
| 2023/0270162 | A1* | 8/2023 | Loveday | A24F 40/40<br>131/328 |

FOREIGN PATENT DOCUMENTS

| | | | |
|---|---|---|---|
| CN | 111096489 | A | 5/2020 |
| CN | 111493361 | A | 8/2020 |
| WO | 2017118553 | A1 | 7/2017 |
| WO | 2019012359 | A1 | 1/2019 |
| WO | 2019122874 | A1 | 6/2019 |

* cited by examiner

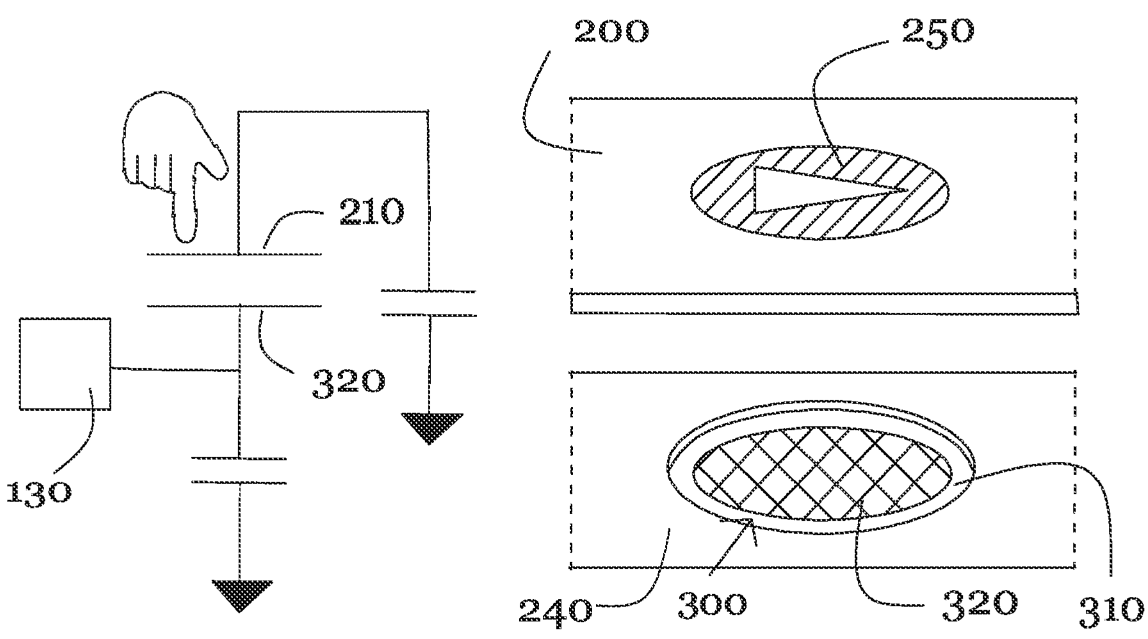
Fig. 2A
Fig. 2B
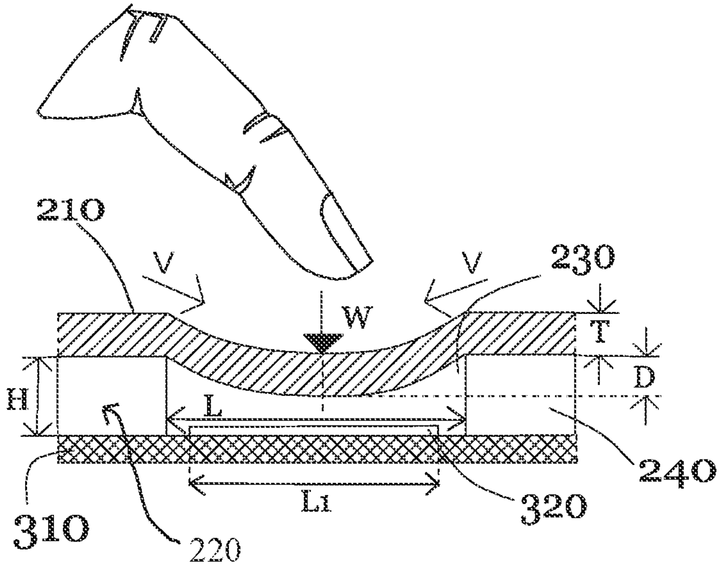
Fig. 2C

AEROSOL GENERATION DEVICE WITH CAPACITIVE SENSOR AND MANUFACTURING METHOD THEREOF

CROSS-REFERENCE TO RELATED APPLICATIONS

The present application is a national phase entry under 35 U.S.C. § 371 of International Application No. PCT/EP2021/080875, filed Nov. 8, 2021, published in English, which claims priority to European Application No. 21157091.6, filed Feb. 15, 2021, the disclosures of which are incorporated herein by reference in their entireties.

FIELD OF INVENTION

The present invention relates to an aerosol generation device, in particular an aerosol generation device with a capacitive sensor and a manufacturing method of the aerosol generation device.

TECHNICAL BACKGROUND

The popularity and use of aerosol generation devices (also known as heat-not-burn products or E-cigarettes) have grown rapidly in the past few years. Various devices and systems are available that heat or warm aerosolisable substances as opposed to burning tobacco in conventional tobacco products.

A commonly available reduced-risk or modified-risk device is the heated substrate aerosol generation device or heat-not-burn device. Devices of this type generate an aerosol or vapor by heating an aerosol substrate that typically comprises moist leaf tobacco or other suitable solid aerosolisable material to a temperature typically in the range 150° C. to 350° C. Heating such an aerosol substrate, but not combusting or burning it, releases an aerosol that comprises the components sought by the user, but not the toxic and carcinogenic by-products of combustion and burning. There is also another type of E-cigarette, the operation method of which is to evaporate liquid to form smoke. For both types of aerosol generation devices, a compact, portable, easy-to-use and robust design is important.

The current aerosol generation devices usually have a housing assembled by various parts, such as buttons having cutting slots and gaps in-between the housing. The common arrangement for the housing and the buttons makes the devices vulnerable for, for example, wet air, dust, liquids in daily life, and bits from the consumable. There is also a desire to improve the strength, the ability to contain flaws, and the crack-resistance performance for the housing and the button in-between the housing used in the conventional aerosol generation device.

SUMMARY OF THE INVENTION

A 1$^{st}$ aspect of the invention is an aerosol generation device for consuming an aerosol generation substrate, wherein the aerosol generation device comprises a housing and a control unit, the housing having an outer layer comprising an elastically deformable area, and the control unit comprising:

- a printed circuit board having a plurality of electrical transmission lines for electrically connecting components thereon, and
- a capacitive sensor component arranged on the printed circuit board; wherein

- the printed circuit board is fixedly arranged below the elastically deformable area of the outer layer, with one side of the layer in the elastically deformable area facing the capacitive sensor component, and
- the outer layer is spaced apart from the capacitive sensor component such that when the user depresses the outer layer in the elastically deformable area, the capacitive sensor component can sense a change in capacitance between the outer layer and the capacitive sensor component.

With a control unit and a seamless design as such, the aerosol generation device can make the device housing cheap to manufacture, comfortable to hold, robust, dust-proof, waterproof and scratch-resistant. It makes the control unit able to sense and differentiate soft touch or hard touch so as to sense more accurately whether the user intends to press the button or just holding the device which may unintentionally touch the surface above the control unit. It also makes the user operate the portable aerosol generation device in winter easily without the need of taking off gloves.

According to a 2$^{nd}$ aspect, in the preceding aspect, the outer layer comprises or preferably is made of a conductive material, preferably a metal, more preferably aluminum, and most preferably aluminum al 1017.

The metal materials used in this invention are rigid and robust and yet soft enough to deform by the press of the user thanks to their Young's module, and flexible enough to restore into their original shape after the press thanks to the yield strength they have.

According to a 3$^{rd}$ aspect, in the 1$^{st}$ and 2$^{nd}$ aspects, the aerosol generation device comprises a support structure configured to fix the printed circuit board and the capacitive sensor component underneath the outer layer, so as to define a sensing space enclosed therein.

According to a 4$^{th}$ aspect, in any one of the preceding aspects, the aerosol generation device comprises an inner chassis comprising or preferably made of metal and/or polycarbonate, wherein the sensing space is defined by the inner chassis and the outer layer, and the printed circuit board and the capacitive sensor component are fixed within the enclosure space.

A polycarbonate chassis is easy to form in different shapes and easy to customize for different control units. The polycarbonate chassis is also rigid enough to prevent compression and make it possible to insulate the printed circuit board and the housing so as to avoid undesired dysfunction of the sensor.

According to a 5$^{th}$ aspect, in the preceding aspect, the inner chassis is integrated with the housing.

The integration of the inner chassis and the housing of the 5$^{th}$ aspect avoids the need of applying clips, screws, bolts or glues in-between, which are usually used in the infinite support structure. Hence, the integration brings the benefit of having a seamless out surface and a smaller size.

According to a 6$^{th}$ aspect, in any one of in the preceding aspects, the aerosol generation device (100) is configured to comply with the following equations:

$$I = \frac{L \times T^3}{12}$$

$$D = \frac{W \times L^3 \times K1}{192 \times E \times I}$$

wherein L is an average width (dimension) of the sensing space with the unit of mm, and preferably the electrode of the sensor, having a shape such as circle or square, has substantially the same dimension as the sensing space; T is the thickness of the outer layer with the unit of mm; I is the second moment of area of the outer layer in the elastically deformable area with the unit of $mm^4$; W is the force applied to the elastically deformable area with the unit of N; K1 is the etching factor of the outer layer in the elastically deformable area; E is the Young's modulus of the outer layer; and D is the deflection of the outer layer due to the force applied, with the unit of um.

According to a 7$^{th}$ aspect, in the preceding aspect, an average height H of the sensing space between the outer layer and the capacitive sensor component is at least 16 um, preferably at least 17 um, more preferably at least 18 um, even more preferably at least 19 um, and most preferably at least 20 um, and/or at most 25 um, preferably at most 24 um, more preferably at most 23 um, even more preferably at most 22 um and most preferably at most 21 um;

the deflection D of the outer layer, preferably at the center, of the elastically deformable area is at least 4 um, preferably at least 5 um, and most preferably at least 6 um, and/or at most 11 um, preferably at most 10 um, more preferably at most 8 um and most preferably at most 7 um;

the outer layer has an average thickness T of at least 0.3 mm, preferably at least 0.4 mm, and most preferably at least 0.5 mm, and/or at most 0.7 mm, preferably at most 0.6 mm;

the sensing space has an average width or a diameter L of at least 11 mm, preferably at least 12 mm, and most preferably at least 13 mm, and/or at most 16 mm, preferably at most 15 mm, and more preferably at most 14 mm; and/or in order to be sensed by the capacitive sensor component, the force W applied to the elastically deformable area is at least 1 N, preferably at least 1.5 N, more preferably 2 N, and most preferably at least 2.5 N, and/or at most 5 N, preferably at most 4.5 N, more preferably at most 4 N, even more preferably at most 3.5 N, and most preferably at most 3 N.

According to an 8$^{th}$ aspect, in the any one of the preceding aspects, the outer layer comprises a plurality of elastically deformable areas, and the control unit comprises a plurality of capacitive sensor components correspondingly arranged underneath the plurality of elastically deformable areas, and the pitch dimension P between a center of one of the elastically deformable areas and a center of the elastically deformable area next to it is at least 29 mm, preferably at least 30 mm, more preferably at least 31 mm, and most preferably at least 32 mm, and/or at most 37 mm, preferably at most 36 mm, more preferably at most 35 mm, even more preferably at most 34 mm, and most preferably at most 33 mm.

The 8$^{th}$ aspect makes sure that an operation on one of the elastically deformable areas does not affect the elastically deformable areas and the capacitive sensors next to it.

According to a 9$^{th}$ aspect, in any one of the preceding aspects, the capacitive sensor component comprises a capacitive proximity sensor.

According to a 10$^{th}$ aspect, in any one of the preceding aspects, the control unit comprises a switching module and an operational module, both arranged on the printed circuit board, wherein the switching module is electronically coupled with the capacitive sensor component and the operational module, and the operational module is configured to at least operate the switching module according to a sensing of the change in capacitance between the outer layer and the capacitive sensor component by the capacitive sensor component.

According to an 11$^{th}$ aspect, in any one of the preceding aspects, the capacitive sensor component is configured to switch on the switching module when the capacitive sensor component senses that the deflection of the outer layer, preferably at the center, of the elastically deformable area is within a predetermined range.

According to a 12$^{th}$ aspect, in any one of the preceding aspects, the outer layer has a seamless surface encompassing the elastically deformable area and its surroundings.

According to a 13$^{th}$ aspect, in any one of in the preceding aspect, the seamless surface corresponds to at least 50%, preferably at least 70%, more preferably at least 80%, even more preferably at least 90%, yet even more preferably at least 95%, and most preferably 100% of the surface of the outer layer.

According to a 14$^{th}$ aspect, in any one of in the 1$^{st}$ to 12$^{th}$ aspects, the housing is a unibody housing.

According to a 15$^{th}$ aspect, in the preceding aspect, the unibody housing has an elongated shape, and the unibody housing is seamless around the entire circumferential surface around the longitudinal axis thereof and/or is completely seamless with an opening at one longitudinal end of the unibody housing.

The arrangement in the 15$^{th}$ aspect improves the integration and seamlessness of the device housing.

A 16$^{th}$ aspect of the invention is a manufacturing method of an aerosol generation device (100) according to any one of the 1$^{st}$ to 15$^{th}$ embodiments, comprising the steps of:

forming a housing having an outer layer by a deep drawn process or an extrusion process; and fixing a control unit underneath the outer layer with a space between the outer layer and a capacitive sensor component comprised by the control unit.

The manufacturing method according to the 16$^{th}$ aspect makes it possible for the aerosol generation device to have a highly integrated and seamless outer surface.

According to a 17$^{th}$ aspect, the manufacturing method in the preceding aspect comprises the step of:

fixing the control unit underneath the outer layer by keying a printed circuit board which is comprised by the control unit into slots of an inner chassis comprised by the aerosol generation device, or by bonding the printed circuit board and the outer layer by a spacing element.

Preferred embodiments are now described, by way of example only, with reference to the accompanying drawings.

BRIEF DESCRIPTION OF THE DRAWINGS

FIGS. 2A to 2C respectively show schematic illustrations of a circuit diagram, an exploded view, and a cross section view of a part of the control unit and the outer layer of the aerosol generation device according to embodiments of the invention;

DETAILED DESCRIPTION OF PREFERRED EMBODIMENTS

Figures 1A, 1B, 1C:
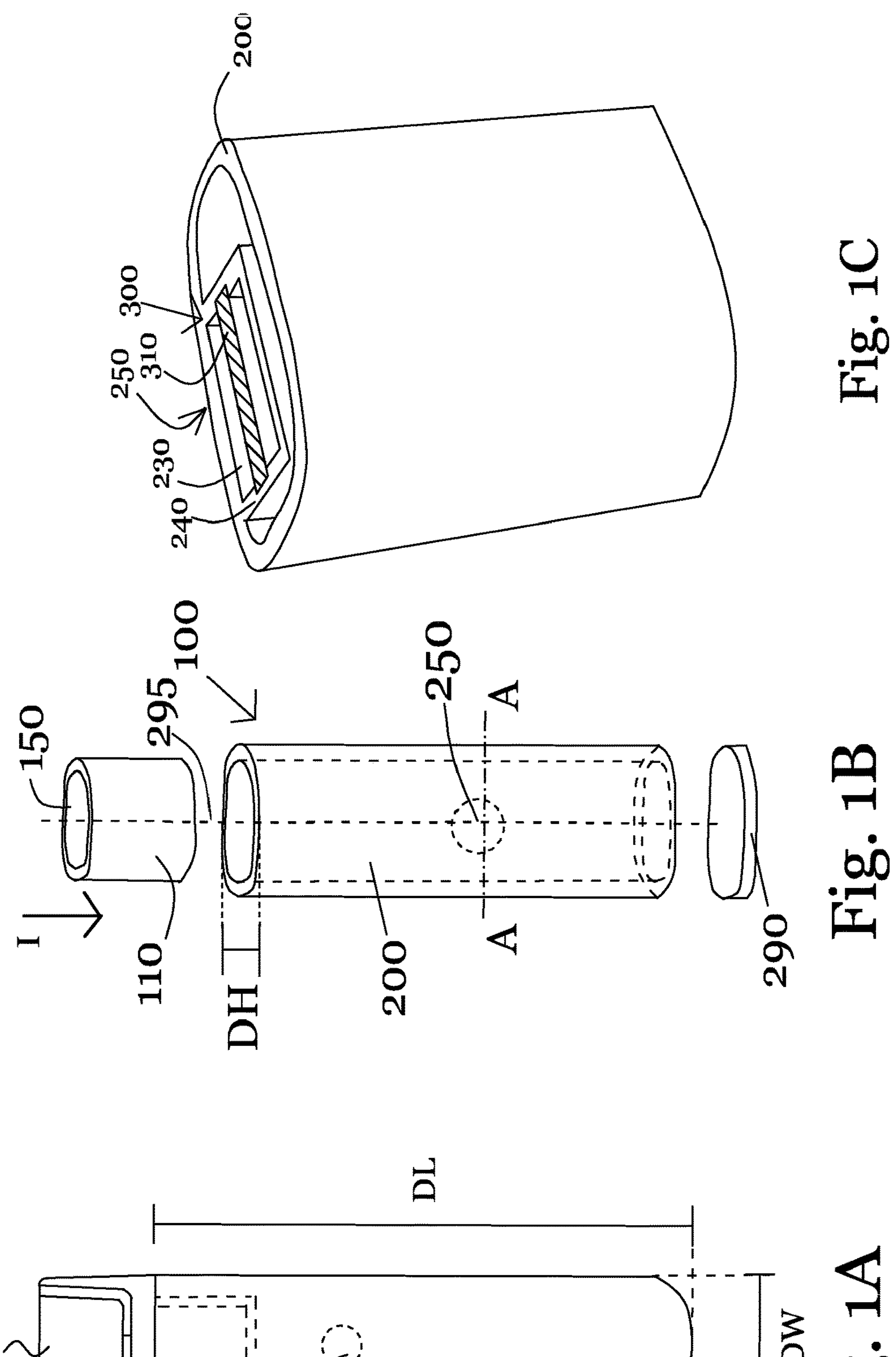
FIGS. 1A to 1C respectively show schematic illustrations of a side-view, an exploded view, and a cross section view of an aerosol generation device according to embodiments of the invention.

In the description of the present invention, it should be understood that the terms "one end", "the other end", "outer side", "upper", "above", "inner side", "under", "below", "horizontal", "coaxial", "central", "end", "part", "length", "outer end" etc., which indicate the orientation or positional relationship, are based on the orientation or positional relationship shown in the drawings. The terms such as "upper", "above", "below", "under" and the like used in the present invention to indicate a relative position in space are used for the purpose of facilitating explanation to describe a unit or feature shown in the drawings relative to the relationship of another unit or feature. The term of the relative position in space may be intended to include different orientations of the device in use or operation other than those shown in the figures. For example, if the device in the figure is turned over, the unit described as being "below" or "under" other units or features will be "above" the other units or features. Therefore, the exemplary term "below" can encompass both the above and below orientations. The device can be oriented in other ways (rotated by 90 degrees or other orientations), and the space-related descriptors used herein are explained accordingly. More specifically, the word "above" means that one unit, layer or element is arranged or configured relatively in an exterior direction (position) of the device towards the (an)other unit(s), layer(s) or element(s); the word "below" means that one unit, layer or element is arranged or configured relatively in an interior direction (position) of the device towards the other units, layers or elements.

As shown in FIG. 1A, the aerosol generation device 100 is a portable device comprising a device housing 200 having. The device housing 200 is configured to accommodate an aerosol generation unit for generating an aerosol for consumption by a user. The device housing 200 is made of one piece and has a unibody or a monobloc body, which is produced by the methods of molding, preferably by deep drawn process or extrusion process. Other ways of producing a unibody or monobloc housing, which are known to the skilled person in the art, may also be used. The unibody comprises or preferably is made of a conductive material, preferably a metal, such as mild steel or stainless steel, more preferably aluminum, and most preferably aluminum al 1017. The metal overlay conveys to the control unit high noise immunity performance. In this embodiment, the device housing 200, specifically the outer metal overlay 210 of the device housing 200, forms the entire visible outer housing of the device; in other words, the device housing 200 corresponds to 100% of the outer housing of the device 100. The outer layer 210, which has a completely seamless outer surface, has only an opening at a top end in the longitudinal axis direction of the housing 200, for receiving the aerosol generation unit 120, and a semi-spherical surface at the bottom end. The virtual surface of the opening is perpendicular to the longitudinal axis 295. The semi-spherical surface at the bottom end is preferred because it is easy to be made by deep drawn process or extrusion process, and would prevent the user to place the device upright on a flat surface, such as a table, which may cause unwanted falling of the device 100. Alternatively, the bottom end may have an integrated flat surface (not shown).

FIG. 1B illustrates a partial exploded view of an aerosol generation device 100 according to another embodiment of the invention. The unibody housing is seamless around the entire circumferential surface around the longitudinal axis 295 (shown in dashed line), which is parallel to the insertion direction I (longitudinal direction of the elongated shape) of the substrate 120 and in a substantially central position thereof, of the aerosol generation device 100, which forms a seamless metal sleeve having two openings. A separate bottom cap 290 is attached to the housing 200 with fastening means, such as glue or screws, preferably on the bottom cap. The inner parts of the device 100 are inserted or keyed into the unibody housing 200 during manufacturing.

In other embodiments, not shown in the figures, the seamless device housing 200 may correspond to substantially most of the outer casing of the aerosol generation device 100. For example, a top cover or cap may be hinged with the seamless device housing 200 forming the entire outer casing of the aerosol generation device 200. Specifically, it may correspond to at least 50%, preferably at least 60%, more preferably at least 70%, even more preferably at least 80%, yet even more preferably at least 90%, and most preferably at least 95% of the entire outer casing seen from the outside of the aerosol generation device 100. In yet another embodiment, the device housing 200 may be assembled with several parts, and one of these parts has a seamless surface located above a control unit 300.

The aerosol generation unit comprises a heating unit 110 that is configured for heating a consumable 120 comprising an aerosol generation substrate. The heating unit 110 is located and connected with the aerosol generation device 100 at the top end of the aerosol generation device 100. The aerosol generation device 100 also comprises a power supply that may be a replaceable and/or rechargeable power supply, and may additionally be provided with a USB port functioning as a charging port for charging the rechargeable power supply or a data transmission line, and an operator/CPU 130. The power supply may be a battery that may be provided with a battery vent and a battery vent cover. The power supply is configured to provide power and electrically connect to the heating unit 110 and other electrical elements of the aerosol generation device 100.

The aerosol generation device 100 may have an elongated shape to improve the comfort for a user when holding the aerosol generation device 100. The longitudinal direction of the aerosol generation device 100 is the direction in which the aerosol generation device 100 is elongated and is the insertion direction I along which the consumable 120 is inserted. The extensions of the aerosol generation device 100 in the longitudinal direction correspond to the length DL of the aerosol generation device 100, and the longitudinal direction of the aerosol generation device 100 corresponds to the length direction of the aerosol generation device 100. The aerosol generation device 100 has a transverse cross-section that lies in a transversal plane that is transverse to the longitudinal direction of the aerosol generation device 100. The transverse cross-section of the aerosol generation device 100 may in general be of any appropriate shape, but is preferably of a rectangular, squared, circular, or elliptical shape. The longitudinal direction of the cross-section is a first transverse or radial direction of the aerosol generation device 100 and corresponds to the direction in which the cross-section may be elongated. The extension of the cross-section in the first transverse or radial direction corresponds to the width DW of the aerosol generation device 100, and the first transverse or radial direction of the aerosol generation device 100 corresponds to the width direction of the aerosol generation device 100. A direction perpendicular to the length direction and the width direction of the aerosol generation device 100 is a second transverse or radial direction of the aerosol generation device 100. The extension of the cross-section in the second transverse or radial direction corresponds to the height DH of the aerosol generation device 100, and the second transverse or radial direction corresponds to the height direction of the aerosol generation device 100. In case of a circular cross-section, the width direction and height direction may be chosen at will as long as they are perpendicular to each other. In case of a squared cross-section, the width direction corresponds to the direct distance direction between two opposing sides of the square, and the height direction corresponds to the direction perpendicular to the width direction in the plane of the cross-section. In the present embodiment, the length DL of the aerosol generation device 100 is about 100 mm, the width DW of the aerosol generation device 100 is about 20 mm, and the height DH of the aerosol generation device 100 is about 15 mm.

The aerosol generation device 100 may be an electronic cigarette and may be configured to generate an aerosol from an e-vapor or t-vapor aerosol generation substrate. For example, as shown in FIGS. 1A and 1B, the receptacle 150 of the heating unit 110 may be configured for receiving a cartridge 120 containing an aerosol generation substrate such as a liquid, and the heating unit 110 may comprise a wicking element and a heating element configured for heating the wicking element. Depending on the aerosol generation substrate, the heating unit 110 may heat or provide a power so as to heat the aerosol generation substrate to temperatures up to 350° C. for generating an aerosol. The aerosol generation device comprises an airflow path which extends from an air inlet via the aerosol generation unit to an air outlet. When a user consumes a consumable by inhaling a generated aerosol, air enters the air inlet, passes to the aerosol generation unit where an aerosol is generated by the heating unit by heating the aerosol generation substrate, and transports the generated aerosol to the air outlet such as a mouthpiece. Alternatively, the receptacle 150 of the heating unit 110 may be configured for receiving a tobacco stick or similar consumable 120 with substrates such as nicotine. A heating element may be configured for heating the receptacle 150 and the tobacco stick received in the receptacle.

As shown in FIGS. 1A and 1B, an operation interface portion 250 (dashed circle) may be provided at a portion of the outer layer of the device housing 200 where the user can easily reach with fingers when using the aerosol generation device 100. The operation interface portion 250 may be printed, silkscreened or etched with a pattern, graphic or symbol so as to indicate the location and/or the function of the button(s).

FIG. 1C shows a cross section view along the A-A line of the aerosol generation device 100 in FIG. 1B, a control unit 300 is configured underneath the operation interface portion 250 (at the back side of the aerosol generation device 100 in FIG. 1C). The operation interface portion 250, together with the control unit 300, can be actuated by a user for providing an operation input to the aerosol generation device 100. The control unit 300 comprises a printed circuit board 310, preferably a flexible printed circuit board, and at least one capacitive sensor 320, preferably a capacitive proximity sensor. The capacitive sensor component 320 is arranged on the printed circuit board 310 together with other electronic components, for example an operator or CPU 130. The printed circuit board 310 is fixedly arranged in an inner chassis 240 which forms a support structure 220 for the printed circuit board 310 in a way that the printed circuit board 310 is spaced apart from the outer layer 210 of the housing 200. Therefore, a sensing space 230 is defined by the inner chassis 240 and the printed circuit board 310. The sensing space 230 may be partially defined by a hollow which is etched from the device housing 200 and has substantially the same size and shape as the sensor 320 arranged on the circuit board 310. Unlike the conventional capacitive sensor arrangement, which usually has a non-conductive surface like plastic or glass firmly attached and flush against the sensor 320, a space or an air gap, i.e. the sensing space 230, is configured between the outer layer 210 and the capacitive sensor 320 in this invention.

The circuit schematic view shown in FIG. 2A illustrates the operation theory of the control unit 300 of present invention. The conductive outer layer 210 and the capacitive sensor 320 form two parallel capacitor plates. The capacitive sensor 320 measures the change between the two parallel capacitor plates which are suspended above the capacitive sensor 320. The user may use his finger to apply a force onto the metal outer layer 210, which causes a slight local mechanical deformation of the metal outer layer 210. The distance between the two parallel capacitor plates, or the conductive outer layer 210 and the capacitive sensor 320, is changed. The capacitive sensor 320 senses a change of the capacitance caused by the change of the distance. In order to make such arrangement functional and immune to conducted noise, the metal outer layer 210 should be grounded as shown in the figure. The sensed value of the changed capacitance is then transferred to the operator 130 which is electronically connected to the capacitive sensor 320 to check if the changing value is within a predetermined range stored in a storage unit comprised by the control unit 300. If yes, a switch comprised in the control unit 300 may be switched on so as to activate the heater 110 of the aerosol generation device 100 or to change a setting of the aerosol generation device 100 or to input a variety of commands to the device 100.

In the conventional capacitive sensor arrangement, the user's finger corresponds to one of the parallel capacitor plates. Therefore a non-conductive outer layer such as plastic or glass is usually used. However, these non-conductive materials are usually not eco-friendly and they do not have good scratch resistance performance. While the high sensitivity of the capacitive sensing is kept, a metal outer layer and surface improves the scratch proof performance of the outer housing 200 of the device. Metal is also easy to form in shape with a robust look. Besides, the user does not need to take off the glove in the winter to operate the button and does not need to be concerned about misoperation by unintentional touching on the surface.

FIG. 2B illustrates a partial exploded view of the device housing 200 and the control unit 300. The control unit 300, specifically the capacitive sensor 320, is spaced apart from the device housing 200, specifically the outer layer 210, with a spacer 240. The spacer 240 may be a part of the inner chassis of the aerosol generation device 200. The inner chassis may be integrated with the outer housing 200 as shown in FIG. 1C, or a separate part that is inserted into the housing 200 during manufacturing. The spacer 240 may also be a plate with an opening, preferably an insulating plate with openings or cutouts which are aligned with the capacitive sensor 320. The printed circuit board 310 and the housing 200 are bonded with and therefore sandwich the spacer 240 with, for example, nonelastic adhesive. The opening of the spacer 240 partially forms and defines the sensing space between the outer housing 200 and the capacitive sensor 320.

Above the capacitive sensor 320 and in the outer housing 200, an elastically deformable area 250 is arranged. The elastic property of the elastically deformable area 250 may be a property of the material of the outer housing 200 or may be enhanced by an etching 210 with a pattern or graphic 250 on the outer layer 210. Preferably the elastically deformable area 250 is arranged right above the capacitive sensor 320 for more accurate sensing of the touch of the user. The capacitive touch sensor 320, which is configured to detect a user input from the elastically deformable area 250, is electronically connected to the PCBA. The PCBA comprises the flexible printed circuit 310, extending below and parallel to the outer housing 200, electrical lines and other electrical components (not shown). In the present embodiment, the capacitive sensor and its corresponding elastically deformable area 250 have circular shapes of about the same size or a slightly larger size than the elastically deformable area 250 and the width dimension of the sensing space.

FIG. 2C shows a partial and enlarged cross section view of the aerosol generation device 1, with details of the outer layer 210, the spacer 240, the control unit 300 having the printed circuit board 310, and the capacitive sensor 320. The user may touch the outer layer 210 with a finger so as to apply a force W of about 2.5 N on the elastically deformable area 250 above the capacitive sensing area of the capacitive sensor 320 so as to cause an elastic deformation D of about 9.6 um approximately at the centre (dashed line) of the elastically deformable area 250. When the force W of about 2.5 N is applied on the elastically deformable area 250, it results in a slight deformation V at the vertical structure (towards the center of the elastically deformable area 250, in other words, the slight deformation V at the vertical structure means that the elastically deformable area 250 deflects toward the sensitive area L1 on the PCB), ensuring that the 9.6 um deformation on the sensor is maintained. This change in length is adequate for capacitance change detection and is also within the elastically deformable area 250 of the outer housing 200 to ensure that the original shape is returned when the force is removed. The temporary shape change is self-reversing after the force is removed, so that the outer layer 210 returns to its original shape. The elastic deformation is a change in the shape of a material at low stress that is recoverable after the stress is removed thanks to the high yield strength of the mentioned metal material.

In order to achieve the mechanical design of the present invention, equations as follows should be satisfied:

$$I = \frac{L \times T^3}{12}$$

$$D = \frac{W \times L^3 \times K1}{192 \times E \times I}$$

L is an average width and/or diameter of the sensing space 230 or the dimension (width/diameter) of the elastically deformable area 250 with the unit of mm, and preferably the electrode of the sensor, having a shape such as a circle or square, has substantially the same dimension as the sensing space, and in this embodiment, the dimension (width/diameter) of the elastically deformable area and L1 for the sensing space are very closely matched, namely substantially identical; T is the thickness of the outer layer 210 with the unit of mm; I is the second moment of area of the outer layer 210 in the elastically deformable area 250 with the unit of $mm^4$; W is the force applied to the elastically deformable area 250 with the unit of N (Newton); K1 is the etching factor of the outer layer 210 in the elastically deformable area 250; E is the Young's modulus of the outer layer 210; and D is the deflection of the outer layer 210 due to the force applied with the unit of um. Specifically, an average height H of the sensing space 230 between the outer layer 210 and the capacitive sensor component 320 is at least 16 um, preferably at least 17 um, more preferably at least 18 um, even more preferably at least 19 um, and most preferably at least 20 um, and/or at most 25 um, preferably at most 24 um, more preferably at most 23 um, even more preferably at most 22 um and most preferably at most 21 um. The deflection D of the outer layer 210, preferably at the center, of the elastically deformable area 250 is at least 4 um, preferably at least 5 um, and most preferably at least 6 um, and/or at most 11 um, preferably at most 10 um, more preferably at most 8 um, and most preferably at most 7 um. The outer layer 210 has an average thickness T of at least 0.3 mm, preferably at least 0.4 mm, and most preferably at least 0.5 mm, and/or at most 0.7 mm, preferably at most 0.6 mm. The sensing space 230 has an average width or a diameter L of at least 11 mm, preferably at least 12 mm, and most preferably at least 13 mm, and/or at most 16 mm, preferably at most 15 mm, and more preferably at most 14 mm. In order to be sensed by the capacitive sensor component 320, the force W applied to the elastically deformable area 250 is at least 1 N, preferably at least 1.5 N, more preferably at least 2 N, and most preferably at least 2.5 N, and/or at most 5 N, preferably at most 4.5 N, more preferably at most 4 N, even more preferably at most 3.5 N, and most preferably at most 3 N. For the Young's Modules E, if the outer housing 200 is made of stainless steel, the Young's Modules E is about $2.0\times10^{11}$; if the outer housing 200 is made of aluminum, the Young's Modules E is about $7.0\times10^{10}$; if the outer housing 200 is made of mild steel, the Young's Modules E is about $2.1\times10^{11}$. For the etching factor K1, if the skin thickness is about 33%, and if there is a spiral etching on the elastically deformable area 250, the etching factor K1 is 3.370; if there is a showerhead etching on the elastically deformable area 250, the etching factor K1 is 22.000; if there is a pattern etching on the elastically deformable area 250, the etching factor K1 is 3.550; if there is no etching on the elastically deformable area 250, the etching factor K1 is 1.225.

In the above mathematical model, the property of the elastically deformable area's deflection or the stress caused by a moment applied to the elastically deformable area (the second area moment or the area moment of inertia) is related to the product of the width dimension L of the sensing space, and the cube of the thickness T of the outer layer 210. The product of the deflation of the outer layer, the second area moment of the elastically deformable area, and the Young's module of the material of the outer layer is related to the product of the cube of the width dimension L of the sensing space, the force W applied on the outer layer, and the etching factor K1.

Figures 3A, 3B, 3C:
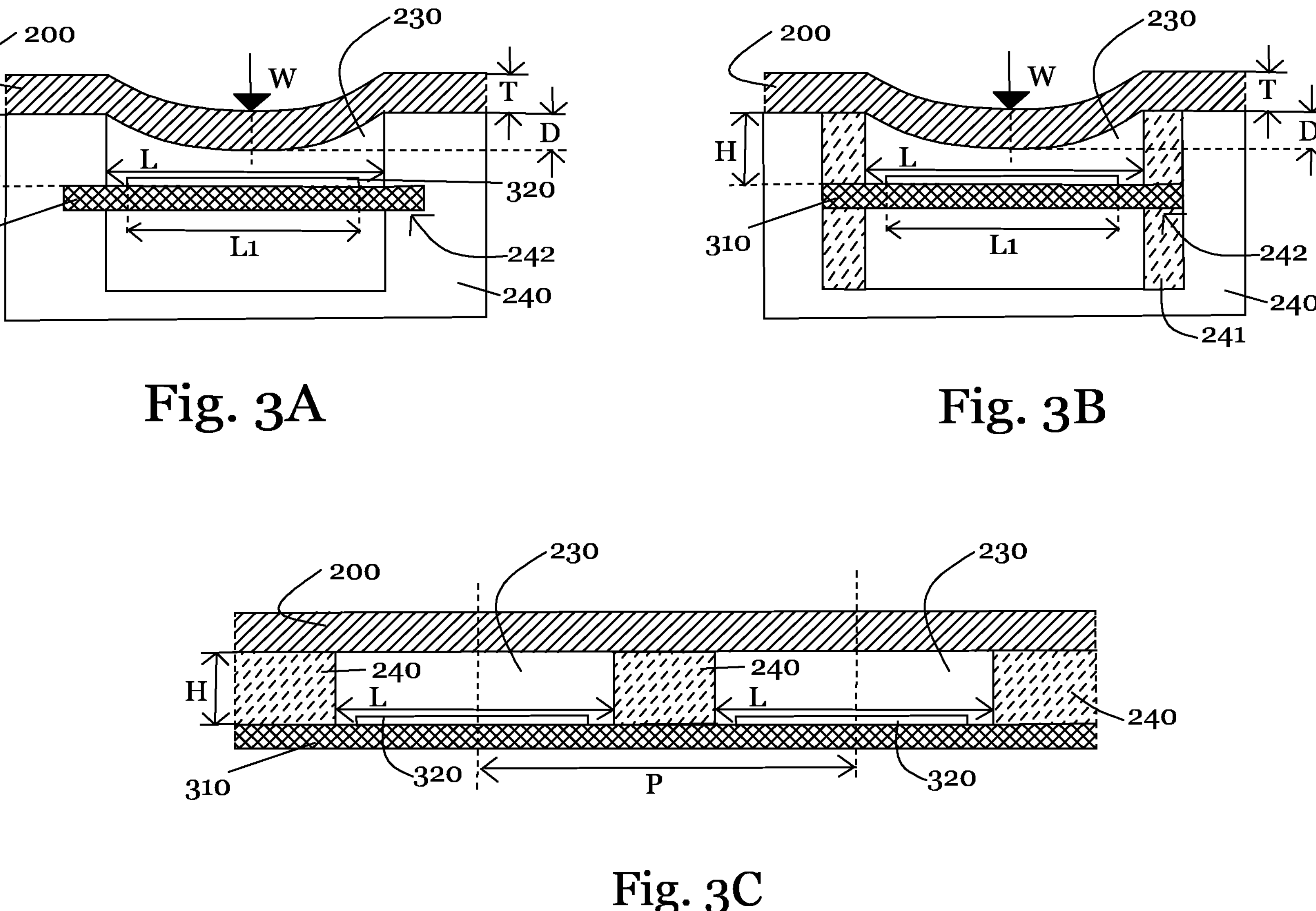
FIGS. 3A to 3C respectively show schematic illustrations of cross section views of a part of the control unit and the outer layer of the aerosol generation device according to embodiments of the invention.

FIG. 3A illustrates another embodiment of the present invention. The sensitive area L1 of the capacitive sensor component 320 is located about 20 um from the elastically deformable area 250 of the metal chassis 240, and the printed circuit board 310 is keyed into a slot 242 on the vertical section of the enclosure. A force of 2.5 N applied on the elastically deformable area 250 results in a deformation of about 0.13 picometers on the vertical structure, ensuring that the 9.6 um deformation on the sensor is maintained.

In order to manufacture the aerosol generation device of this embodiment, the housing 200 should be molded, preferably produced by deep drawn process or an extrusion process, for the integrated and seamless look of the housing 200. In the preferred embodiments, the inner chassis 240 having the slot 242 for the printed circuit board 310 with the sensor 320 may be integrated and formed together with the housing 200 by a deep drawn process or an extrusion process. In other embodiments, the inner chassis is separate from the housing 200 and inserted and fastened into the monobloc housing 200 during manufacturing. The printed circuit board 310 with the sensor 320 is keyed or inserted into the slot 242 before or after the fixation of inner chassis in the housing 200, so as to be arranged underneath and spaced apart from the outer layer 210.

FIG. 3B illustrates yet another embodiment of the present invention. The sensitive area L1 of the printed circuit board 310 is located about 20 um from the elastically deformable area 250 of the metal enclosure, and the printed circuit board 310 is sandwiched between a polycarbonate chassis which forms the support structure for the printed circuit board 310 in the enclosure. The polycarbonate chassis is easy to shape, so that the chassis would be easy to customize for different control units. It is also rigid enough to prevent compression, which makes it possible to insulate the PCB 310 and the housing 200 so as to avoid undesired dysfunction of the sensor. In this embodiment, a force of 2.5 N applied on the elastically deformable area 250 results in a deformation of about 875 picometers on the vertical structure, mainly the polycarbonate chassis, ensuring a deformation of 9.6 um on the sensor is maintained.

According to some embodiments of the present invention, multiple control units 300 are configured in the aerosol generation device 100. As shown in FIG. 3C, the outer layer 210 comprises a plurality of elastically deformable areas 250, and the control unit 300 comprises a plurality of capacitive sensor components 320 arranged underneath the plurality of elastically deformable areas 250 correspondingly, and the pitch dimension P between a center of one of the elastically deformable areas 250 and a center of the elastically deformable area 250 next to it is at least 29 mm, preferably at least 30 mm, more preferably 31 mm, and most preferably at least 32 mm, and/or at most 37 mm, preferably at most 36 mm, more preferably at most 35 mm, even more preferably at most 34 mm and most preferably at most 33 mm.

The invention claimed is:

1. An aerosol generation device for consuming an aerosol generation substrate, wherein the aerosol generation device comprises a housing and a control unit, the housing having an outer layer comprising an elastically deformable area, and the control unit comprising:

a printed circuit board having a plurality of electrical transmission lines for electrically connecting components thereon, and a capacitive sensor component arranged on the printed circuit board; wherein the printed circuit board is fixedly arranged below the elastically deformable area of the outer layer, with one side of the layer in the elastically deformable area facing the capacitive sensor component, and the outer layer is spaced apart from the capacitive sensor component such that when a user depresses the outer layer in the elastically deformable area, the capacitive sensor component is configured to sense a change in capacitance between the outer layer and the capacitive sensor component, wherein the control unit comprises a switching module and an operational module, both arranged on the printed circuit board, wherein the switching module is electronically coupled with the capacitive sensor component and the operational module, and the operational module is configured to at least operate the switching module according to a sensing of a change in capacitance between the outer layer and the capacitive sensor component by the capacitive sensor component; wherein the capacitive sensor component is configured to switch on the switching module when the capacitive sensor component senses that the deflection of the outer layer of the elastically deformable area is within a predetermined range.

2. The aerosol generation device according to claim 1, wherein the outer layer comprises a conductive material.

3. The aerosol generation device according to claim 1, comprising a support structure configured to fix the printed circuit board and the capacitive sensor component underneath the outer layer, so as to define a sensing space enclosed therein.

4. The aerosol generation device according to claim 3, comprising an inner chassis comprising metal and/or polycarbonate, wherein the sensing space is defined by the inner chassis and the outer layer, and the printed circuit board and the capacitive sensor component are fixed within the chassis.

5. The aerosol generation device according to claim 4, wherein the inner chassis is integrated with the housing.

6. The aerosol generation device according to claim 3, wherein the aerosol generation device is configured to comply with the following equations:

$$I = \frac{L \times T^3}{12}$$

$$D = \frac{W \times L^3 \times K1}{192 \times E \times I}$$

wherein L is an average width of the sensing space with the unit of mm, T is a thickness of the outer layer with the unit of mm, I is a second moment of area of the outer layer in the elastically deformable area with the unit of $mm^4$, W is a force applied to the elastically deformable area with the unit of N, K1 is an etching factor of the outer layer in the elastically deformable area, E is Young's modulus of the outer layer, and D is a deflection of the outer layer due to the force applied with the unit of um.

7. The aerosol generation device according to claim 3, wherein an average height H of the sensing space between the outer layer and the capacitive sensor component is at least 16 um;

a deflection D of the outer layer, at the center, of the elastically deformable area is at least 4 um;

the outer layer has an average thickness T of at least 0.3 mm;

the sensing space has an average width or a diameter L of at least 11 mm; and/or in order to be sensed by the capacitive sensor component, a force W applied to the elastically deformable area is at least 1 N.

8. The aerosol generation device according to claim 7, wherein:

the average height H of the sensing space between the outer layer and the capacitive sensor component is 17 mm or 18 mm or 19 mm or 20 mm or 21 mm or 22 mm or 23 mm or 24 mm or 25 mm;

the deflection D of the outer layer, at the center, of the elastically deformable area is 5 mm or 6 mm or 7 mm or 8 mm or 10 mm or 11 mm;

the outer layer has an average thickness T of 0.4 mm or 0.5 mm or 0.6 mm or 0.7 mm;

the sensing space has an average width or a diameter L of 12 mm or 13 mm or 14 mm or 15 mm or 16 mm; and/or in order to be sensed by the capacitive sensor component, a force W applied to the elastically deformable area is 1.5 N or 2.0 N or 2.5 N or 3.0 N or 3.5 N or 4.0 N or 4.5 N or 5.0 N.

9. The aerosol generation device according to claim 1, wherein the outer layer comprises a plurality of elastically deformable areas, and the control unit comprises a plurality of capacitive sensor components correspondingly arranged underneath the plurality of elastically deformable areas, and a pitch dimension P between a center of one of the elastically deformable areas and a center of an adjacent one of the elastically deformable areas is at least 29 mm.

10. The aerosol generation device according to claim 9, wherein the pitch dimension P between a center of one of the elastically deformable areas and a center of an adjacent one of the elastically deformable areas is 30 mm or 31 mm or 32 mm or 33 mm or 34 mm or 35 mm or 36 mm or 37 mm.

11. The aerosol generation device according to claim 1, wherein the capacitive sensor component comprises a capacitive proximity sensor.

12. The aerosol generation device according to claim 1, wherein the outer layer has a seamless surface encompassing the elastically deformable area and surroundings thereof.

13. The aerosol generation device according to claim 12, wherein the seamless surface corresponds to at least 50% of the surface of the outer layer.

14. The aerosol generation device according to claim 13, the seamless surface corresponds to 70% or 80% or 90% or 95% or 100% of the surface of the outer layer.

15. The aerosol generation device according to claim 1, wherein the housing is a unibody housing; and the unibody housing is seamless around an entire circumferential surface around a longitudinal axis thereof and/or is completely seamless with an opening at one longitudinal end of the unibody housing.

16. The aerosol generation device according to claim 15, wherein the unibody housing has an elongated shape.

17. A manufacturing method of an aerosol generation device according to claim 1, comprising the steps of:

forming a housing having the outer layer by a deep drawn process or an extrusion process; and fixing the control unit underneath the outer layer with a space between the outer layer and the capacitive sensor component of the control unit.

18. The manufacturing method according to claim 17, comprising the step of:

fixing the control unit underneath the outer layer by keying the printed circuit board into slots of the inner chassis, or by bonding the printed circuit board and the outer layer by a spacing element.

19. The aerosol generation device according to claim 1, wherein the outer layer comprises a metal or aluminum or aluminum Al 1017.

* * * * *